United States Patent [19]

Heibel

[11] 4,289,217

[45] Sep. 15, 1981

[54] FRICTION PAD ASSEMBLIES FOR DISC BRAKES

[75] Inventor: Helmut Heibel, Moschheim, Fed. Rep. of Germany

[73] Assignee: Lucas Industries Limited, Birmingham, England

[21] Appl. No.: 59,174

[22] Filed: Jul. 20, 1979

[30] Foreign Application Priority Data

Jul. 28, 1978 [GB] United Kingdom ............... 31473/78

[51] Int. Cl.³ .............................................. F16D 65/02
[52] U.S. Cl. ................................................. 188/73.38
[58] Field of Search ........................... 188/73.5, 250 E

[56] References Cited

U.S. PATENT DOCUMENTS 3,899,051  8/1975  Grosseau ............................ 188/73.5

FOREIGN PATENT DOCUMENTS 2204047  8/1973  Fed. Rep. of Germany ..... 188/73.5

Primary Examiner—Duane A. Reger

Attorney, Agent, or Firm—Scrivener, Clarke, Scrivener and Johnson

[57] ABSTRACT

The present specification discloses a friction pad assembly and disc brake incorporating such an assembly, wherein the friction pad assembly comprises a backing plate and a pad of friction material secured thereto, a wire spring being secured to the backing plate. The wire spring comprises a coiled region from which two arms extend in generally opposite directions. The coiled region of the spring is located in a recess in the backing plate with the arms extending from the recess on opposite sides of the backing plate. Thus the spring arms are the only parts of the spring extraneous to the dimensions of the backing plate so that in a simple manner the optimum amount of design space for constructional strength, is available in a brake incorporating such a friction pad assembly. Also, by virtue of the spring arms extending one on each side of the backing plate, stable spring biassing of the friction pad assembly is achieved in the brake.

11 Claims, 6 Drawing Figures

FRICTION PAD ASSEMBLIES FOR DISC BRAKES

DESCRIPTION

The present invention relates to a friction pad assembly for use in a disc brake, and a disc brake incorporating such a friction pad assembly.

A friction pad assembly of the type to which the present invention relates, basically comprises a backing plate to which a pad of friction material is secured. In our copending British Pat. Nos. 1,535,720 and 1,533,976, two methods are disclosed of attaching a spring to the backing plate for the purpose of providing means of biasing the friction pad assembly, when in use in a disc brake, into contact with the torque member and, in so doing, biasing the caliper member with respect to the torque member. These two methods attempt to solve a number of problems as set out in the respective specifications. However, several problems still remain.

Firstly, it is desirable to make the attachement of the spring to the friction pad back plate simple, so that the operation can be performed quickly, preferably manually, and yet the spring can be easy to attach and remove when a replacement is necessary. British Pat. No. 1,533,976 was concerned with a spring which was riveted in position. Removal of the spring was not envisaged, and it would be replaced along with the friction pad assembly. However, this leads to additional cost of the replacement parts. Also, whilst replacement of the spring may be necessary at some state during the life of the brake it is unlikely to be necessary to replace it every time a new set of friction pads is required. British Pat. No. 1,535,720 discloses a leaf spring which is clipped onto the pad backing plate. To ensure a positive location, the spring has to be strong, to such an extent that assembly is difficult, especially manually and removal is virtually impossible.

A second problem is the amount of room taken up in a disc brake by the spring in the direction perpendicular to the plane of the backing plate and behind the pad backing plate. In the above mentioned British Patent Specifications the antirattle spring is attached to a central ear or lug of the backing plate and it is therefore necessary to under cut the inner face of the outboard limb of the disc brake, i.e. of the caliper, usually by machining. Clearly the amount of undercut is determined by the room taken by the spring.

The provision of an undercut reduces the strength of the caliper, and leads to bending of the outboard limb under load, i.e. during braking.

A third problem exists with springs which are incorporated in friction pad assemblies. Invariably they are proportioned in such a way that they impose asymmetrical loads on the friction pads. This may prevent the pads from lying parallel to the disc surface. Clearly this is undesirable since it may lead to peculiar wear patterns.

A further problem with springs which project axially behind the backing plate is to ensure that the spring does not have any sharp edges which could easily damage the protective boot which is used to protect the hydraulically operable piston of the brake. This is a problem with the directly operated pad assembly.

One aim of the present invention is to provide a friction pad assembly having a spring which is easily attached and removed therefrom.

Another aim is to reduce the amount of room taken up by the spring, so that the undercut required is reduced, thus strengthening the caliper.

Yet another aim of the present invention is to provide a friction pad assembly wherein the spring loads the pad asymmetrically allowing the pad to lie parallel to the disc surface.

A further aim is to provide a friction pad assembly with a spring which will not damage the piston boot.

According to the present invention there is provided a friction pad assembly comprising a backing plate and a pad of friction material secured thereto, a wire spring with outwardly extending arms connected by a coiled region, being located with the coiled region in a recess in the backing plate, the said arms extending from the recess on opposite sides of the backing plate.

In a preferred embodiment of the present invention the backing plate is provided with a recess in the form of a generally rectangular shaped hole, where, in transverse cross-section, the height i.e. length, is greater than the width. Alternatively the dimensions may be selected the other way round depending on the shape of the spring. The spring comprises a coiled region which is generally oval in shape and has arms extending outwardly from the central coiled region. At the end of each arm is a hooked portion.

It is intended that the said height of the hole section is greater than the major diameter of the coiled region, the width being greater than the minimum diameter of the coiled region, but less than the major diameter of the coil.

The spring is assembled onto the backing plate by the following procedure.

One arm of the spring is inserted into the hole, with the spring orientated at 90 degrees to its final fitted position. With the spring in such a position the coil will fit in the hole. The spring is then rotated through 90 degrees so that the coiled region of the spring is compressed by the sides of the recess and the spring is located in position. The arms of the spring lie generally parallel to the backing plate and so the hook at the end of each arm lies over the backing plate and prevents the spring from rotating and becoming accidentally detached.

Preferably only the two half coils of the coiled region, which extend into the spring arms, present an oval configuration, the inner coils being preferably round.

In an alternative embodiment the recess in the backing plate may take the form of a groove or slot in an edge region of the backing plate, the relative dimensions of the coiled region of the spring and the groove being preferably as described above with reference to the hole in the backing plate.

According to a further aspect of the present invention there is provided a disc brake comprising a torque member and a caliper member, a friction pad assembly being mounted in the brake on the torque member and comprising a backing plate and a pad of friction material secured thereto, a wire spring with outwardly extending arms connected by a coiled region, being located with the coiled region in a recess in the backing plate, the said arms extending from the recess on opposite sides of the backing plate and engaging the caliper member.

The present invention will now be further described, by way of example, with reference to the accompanying drawings, in which.

Figure 1:
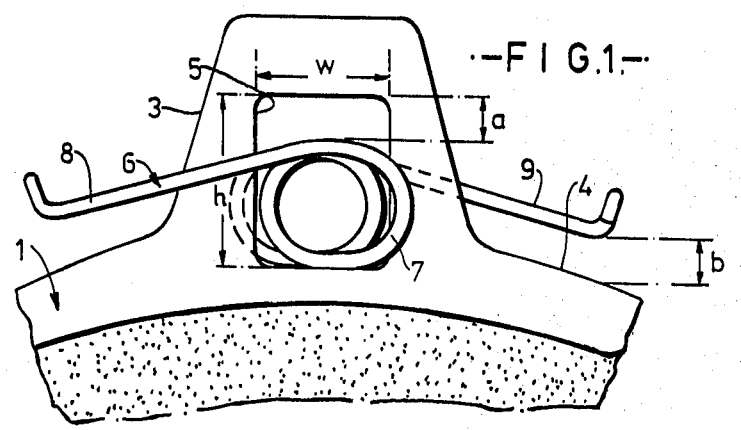
FIG. 1 is a frontal view of one embodiment of a friction pad assembly according to the present invention.
Figure 2:
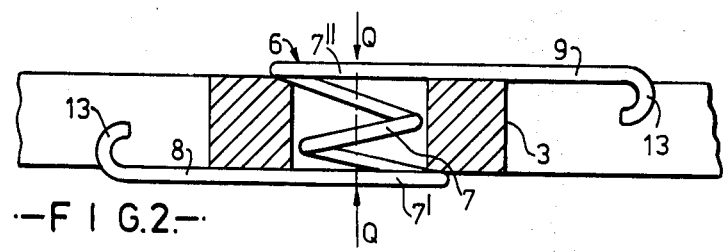
FIG. 2 is a cross-sectional plan view of FIG. 1.
Figure 3A:
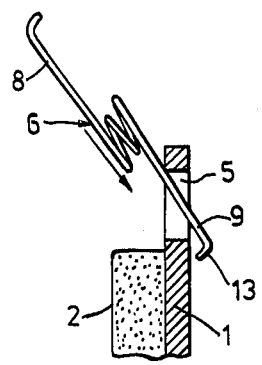
FIGS. 3a, 3b and 3c illustrate how the spring is mounted on the backing plate.
Figure 3B:
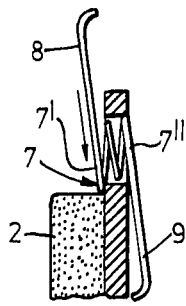
Figure 3C:
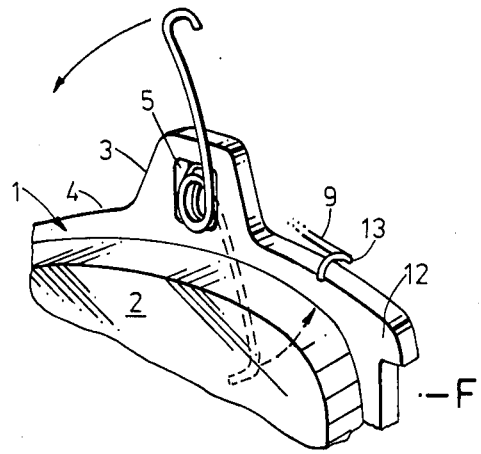

The friction pad assembly illustrated in FIGS. 1 and 2 basically comprises a planar backing plate 1 to which a pad 2 of friction material is secured. The backing plate 1 has a tab 3 which projects in the plane of the backing plate from approximately the middle of an edge 4 of the backing plate. A recess in the form of hole 5 is provided in the tab 3. The hole is generally rectangular and has a height 'h' which is larger than its width 'w'. A spring 6 having a coiled region 7 and two outwardly extending arms 8 and 9, is located in the hole 5. The coiled region 7 of the spring is oval in shape, the height 'h' of the hole 5 being larger than the major diameter of the coiled region and the width 'w' being greater than the minimum diameter of the coiled region but smaller than the major diameter of the coiled region. Alternatively, only the two half coils 7',7" of the coiled region, which extend into arms 8,9, present the oval configuration. To mount the spring 6 on the backing plate arm 9 is first passed through hole 5 (see FIG. 3a) and then coiled region 7 is inserted in hole 5 with its major axis lying substantially parallel to the height 'h' of hole 5. In this position the coiled region is a loose fit in hole 5 (see FIG. 3b). By then rotating the coiled region as shown in FIG. 3c, the major diameter of the coiled region engages and grips the sides of hole 5, the major diameter being larger than width 'w'. The spring is then firmly secured to the backing plate with arm 8 extending in one direction generally parallel to backing plate 1 and on one side of the backing plate, and arm 9 extending in generally the opposite direction on the other side of the backing plate.

In an alternative embodiment (not illustrated) a groove or slot replaces hole 5, the groove or slot having the same dimensional relationship with coiled region 7 of the spring 6 as described hereabove with reference to FIGS. 1 to 3.

Figure 4:
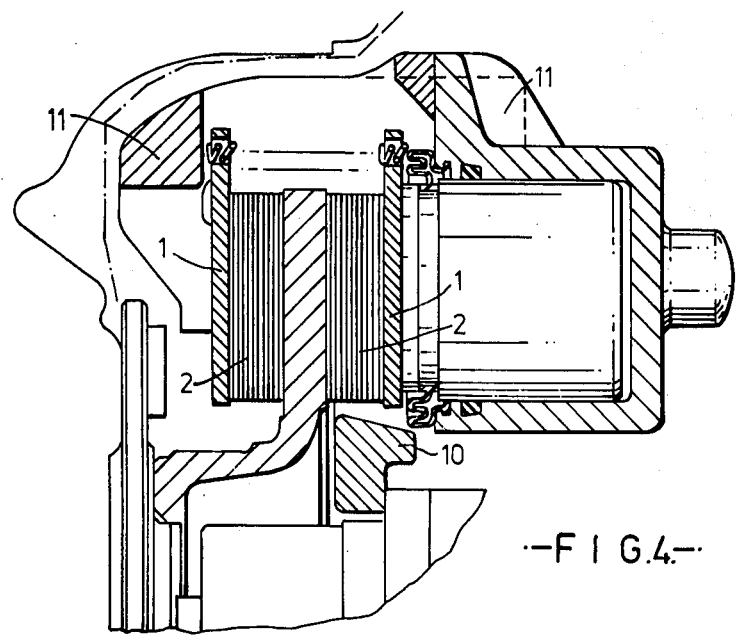
FIG. 4 illustrates part of a disc brake incorporating friction pad assemblies according to the present invention.

The assembled friction pad of FIGS. 1 to 3 is illustrated in FIG. 4 when installed in a sliding caliper disc brake, wherein the brake comprises a torque member 10 and a caliper member 11. The friction pad assemblies are mounted on guides in the torque member 10 by means of lateral shoulders 12 (see FIG. 3c) and arms 8 and 9 of each spring engage the caliper member 11, biasing the friction pad assemblies onto the guides and biasing the caliper member with respect to the torque member. As the coiled region 7 of the spring is within hole 5 and the arms 8 and 9 are snugly against the front and rear faces of the backing plate 1, as best seen in FIG. 2 the spring requires a minimum of space within the brake, thus reducing the amount of undercut relative to that required in the caliper members of prior arrangements, and so strengthening the construction. To ensure that arms 8 and 9 snugly engage the faces of the backing plate, they are arranged to extend generaly radially in opposite directions across the width of the hole 5, as can be seen in FIGS. 1 and 2, and the axial length of the coiled region can be selected slightly smaller than the axial length or depth of the hole 5. Thus, when in situ, the coiled region will be stretched with arms 8 and 9 tensioned against the faces of the backing plate. Further, to reduce the possibility of the spring causing damage within a brake e.g. to the protective boot for the hydraulic piston (not shown), the free ends 13 of the arms 8 and 9 are hooked and thus present a smooth curved surface. These hooked ends 13 also restrict the possible downwards flexing movement of arms 8 and 9 to distance 'b', (see FIG. 1) the ends 13 engaging edge 4 of the backing plate preventing the inadvertent detachment of the spring. Also evident from FIG. 1 is the possible upwards movement 'a' for coiled region 7.

The present invention thus provides a friction pad assembly wherein the anti-rattle spring can be asily and securely attached to the backing plate while taking up a minimum of space and thus enabling the brake in which the assembly is used, to be constructed as strongly as possible. Also, the fact that the arms of the spring extend on opposite sides of the backing plate reduces the possibility of having uneven wear of the pad due to biasing of the assembly by the spring.

I claim:

1. A friction pad assembly comprising a backing plate and a pad of friction material secured thereto, a wire spring with oppositely directed outwardly extending arms connected by a coiled region, being located with the coiled region in a recess in the backing plate, the said arms extending from the recess on opposite sides of the backing plate.

2. A friction pad assembly according to claim 1, wherein the recess is in the form of a generally rectangular shaped hole in the backing plate.

3. A friction pad assembly according to claim 1, wherein at least part of the coiled region of the spring is oval in shape.

4. A friction pad assembly according to claim 2, wherein at least part of the coiled region of the spring is oval in shape.

5. A friction pad assembly according to claim 4, wherein the major diameter of the oval shape is smaller than the length of the rectangular hole, and the minor diameter of the oval shape is less than the width of the hole, the width of the hole being less than said major diameter.

6. A friction pad assembly according to any one of claims 3 to 5, wherein only the two half coils of the coiled region, which extend into said arms, present an oval configuration.

7. A friction pad assembly according to any one of claims 1 to 4, wherein the free end region of each said arm of the spring is bent to form a smooth curved region of the arm.

8. A disc brake comprising a torque member and a caliper member, a friction pad assembly being mounted in the brake on the torque member and comprising a backing plate and a pad of friction material secured thereto, a wire spring with outwardly extending arms connected by a coiled region, being located with the coiled region in a recess in the backing plate, the said arms extending from the recess on opposite sides of the backing plate and engaging the caliper member.

9. The friction pad assembly according to claim 1 wherein the arms extend in opposite directions across said recess.

10. The friction pad assembly of claim 2 wherein the arms extend in opposite directions across the width of said hole and the axial length of the coiled region is smaller than the axial length of the hole so that said coiled region is stretched in said recess and said arms are tensioned against the opposite faces of the backing plate.

11. A friction pad assembly comprising a backing plate and a pad of friction material secured thereto, a wire spring having a central coil region connecting a pair of opposed, oppositely and generally radially extending arms, said spring being located with the coiled region in a recess in the backing plate, the axis of the coiled region being substantially normal to the plane of the backing plate and said arms extending from the recess on opposite sides of the backing plate.

* * * * *